MULTIPLE APERTURE PHOTOSENSITIVE READER

Filed Oct. 29, 1962

INVENTORS.
WILLIAM L. POLAND
WU CHEN
HERBERT F. WELSH
BY
Louis Altman
ATTORNEY 3,192,388
Patented June 29, 1965

3,192,388
MULTIPLE APERTURE PHOTOSENSITIVE READER

Wu Chen and William L. Poland, Norwalk, Conn., and Herbert Frazer Welsh, Philadelphia, Pa., assignors to Sperry Rand Corporation, New York, N.Y., a corporation of Delaware Filed Oct. 29, 1962, Ser. No. 233,597
13 Claims. (Cl. 250—219)

Figures 1, 2, 3, 4, 5, 6, 7, 8, 9, 10, 11:
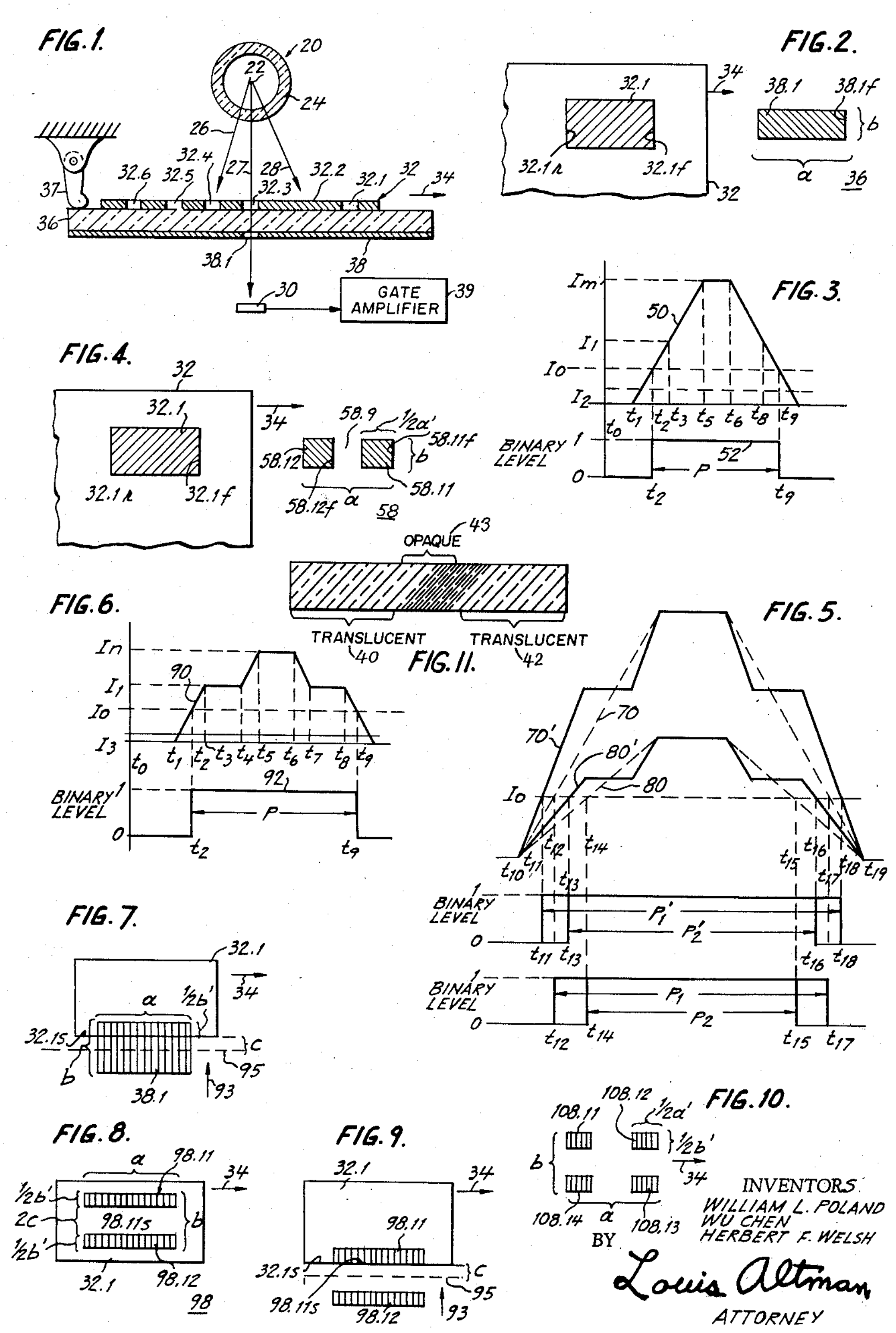

This invention relates to optical reading of perforated data records.

A widely used means of storing and transferring information employs perforated records such as tabulating cards or paper tape, on which each bit of information (i.e., information datum) is represented by the presence or absence of a hole at a selected hole location. One way of reading such records is the optical, or photoelectric, method which consists of shining a light upon the hole locations on the record and then sensing the light that passes through the holes. However there are certain problems involved in this method.

One of these arises from the fact that the intensity of the reading illumination is subject to variation over a period of time, for example as the light output of a lamp deteriorates with age. For reasons which will be explained later, a reduction in light intensity causes a reduction of the duration of the output pulse which is produced to indicate the sensing of a hole. The pulse duration, of course, is important to the satisfactory operation of whatever logic circuitry is actuated by this output pulse.

A second problem arises because punch equipment used to perforate tabulating cards and paper tape is subject to inaccuracies which may result in the misplacing of a punched hole. Such mislocation of the punched hole causes severe reductions in the amount of light which passes through the hole to be sensed by the reader. This inturn causes difficulties relating to the threshold of sensing and also to the above-mentioned problem of pulse duration stability.

A third problem arises because tabulating cards and punched paper tapes consist of relatively thin sheets which are not perfectly opaque to light. A certain amount of leakage light is transmitted through the body of the card or tape at those places where no hole is punched. This leakage illumination is sensed by the light-sensing means, which consequently produces a low level "noise" output. Binary circuitry which receives this output must then discriminate critically between the low noise level and the higher signal level generated by the stronger illumination passing through a punched hole. A decrease in the leakage level would have the desirable effect of improving the accuracy and reliability of an optical reader, as well as reducing the criticality of design requirements for the binary circuitry.

Accordingly, the general objects of this invention are to improve the accuracy and reliability of an optical reader, and to reduce the criticality of the design requirements thereof. Specifically, these objectives are to be accomplished through an increase in pulse duration stability, a decrease in the loss of illumination due to hole mislocation, and/or a reduction of light leakage.

A device for optically reading a perforated record normally includes a radiation source, radiation-sensing means, and a mask for blocking the radiation in a region surrounding a record hole location. (The term "radiation" in this specification and the appended claims as intended to include all frequencies in addition to visible light.) This sort of structure, which is conventional, is improved in accordance with this invention by providing a system of two or more relatively translucent radiation ports formed in the mask, all of which are positioned to read one and the same hole location at the same time, but are at least partly separated from each other by an intervening area of relative opacity. This is in contrast to prior art structures, in which only one radiation port was formed in the mask for each line of hole locations on the record.

The structure summarized above, and the manner in which it achieves the stated objectives, will be fully set forth in the succeeding detailed description, which incorporates the following drawings:

FIG. 1, a side elevational view, with parts in section, of a portion of a prior art optical tabulating card reader;

FIG. 2, a top plan view of a portion of the structure of FIG. 1;

FIG. 3, a set of wave forms pertaining to the structure of FIG. 2;

FIG. 4, a top plan view similar to that of FIG. 2, but showing a structure in accordance with this invention;

FIG. 5, a set of wave forms showing a comparison of the behavior of the structures of FIGS. 2 and 4 under conditions of light intensity reduction;

FIG. 6, a set of wave forms pertaining to the structure of FIG. 4;

FIG. 7, a top plan view similar to FIG. 2 and showing the same structure under conditions of hole mislocation;

FIG. 8, a top plan view similar to that of FIG. 4, showing a further embodiment of this invention;

FIG. 9, a top plan view similar to that of FIG. 8 and showing the same structure under conditions of hole mislocation;

FIG. 10, a similar top plan view showing a still further embodiment of this invention, and FIGURE 11, a sectional view depicting the merger of two apertures, which are blended into one continuous shape.

With reference to these drawings, FIG. 1 illustrates the general arrangement of a typical prior art optical reader for punched tabulating cards. The numeral 20 generally designates a lamp which serves as a source of radiation (in this example visible light), and which includes a wire filament 22 and a glass envelope 24. The wire filament 22 emits light rays such as those represented by the arrows 26–28. Below the lamp 20 is a photoresponsive device of any conventional type (e.g. the semiconductor photocell 30) capable of sensing the light. The photocell 30 provides a current output proportional to the light intensity, for operating binary circuitry 39 of any conventional type. For example, when the light intensity of the photocell 30 reaches a certain level, the gate amplifier 39 is triggered and produces a voltage output which indicates that a hole or binary "one" has been sensed. Between the light bulb 20 and the photocell 30 a data tabulating card 32 is advanced by any conventional mechanism such as, for example, the picker knife 37, in the direction indicated by the arrow 34. A horizontal plate 36, called an aperture plate, serves as a table over which the tabulating card 32 is advanced, and establishes a feed path therefor. In order to permit the light passing through a hole to reach the photocell 30, the aperture plate 36 is commonly made of a transparent material such as glass.

For the purpose of illustration, the card 32 is shown to have six hole locations 32.1–32.6 arranged across its face along a line parallel to the direction of card motion. Holes are punched in the first position 32.1 and the third to sixth positions 32.3–32.6, while no hole appears at the second hole location 31.2. The motion of the card 32 causes the photocell 30 to scan the first through sixth hole locations in that order. Thus one photocell serves to read the entire line of hole locations 32.1–32.6.

One aspect of the problem of light leakage in optical readers is illustrated by the light ray 26, which passes through the hole at the location 32.4 and then would normally continue through the glass aperture plate 36 to the lower region of the optical reader, where it might then be scattered toward the photocell 30. Such leakage light, if sensed by the photocell, increases the noise level. As another aspect of the leakage problem, another light ray 28 passes through the unpunched location 32.2, since a conventional data tabulating card is fairly thin (0.007 inch) and therefore not perfectly opaque. This leakage is attenuated by its passage through the body of the card, but it nevertheless retains enough strength so that, after passing through the glass aperture plate 36 to the lower region of the optical reader, and being scattered toward the photocell 30, it too generates some noise. In order to alleviate these two sources of leakage, it is common in the design of optical card readers to provide a mask consisting either of an aperture plate formed entirely from an opaque material, or in the case of the glass plate 36, shielding such as an apaque metal film 38 plated on the underside thereof. The mask covers the entire area over which light may be transmitted, except that in order to pass light in a direct line from the bulb 20 to the photocell 30 in the photocell 30 the mask is formed with some sort of translucent radiation "port." This term is intended to include a transparent window, a through aperture formed in an opaque material, an opening such as the aperture 38.1 in the shielding, or any other structure which will pass or transmit radiation.

The lamp 20, tabulating card 32, aperture plate 36, and mask 38, all shown in section, are extended perpendicular to the plane of the drawing, and additional photocells 30 and apertures 38.1 are provided each in a row perpendicular to the drawing, so that several parallel lines of hole locations on the tabulating card 32, each extending in the direction 34, can be read simultaneously. But regardless of the number of apertures 38.1 in a prior art structure of the type which FIG. 1 exemplifies, there is only one such aperture poistioned to read a particular hole location (e.g. 32.3) at any one time. The plurality of apertures 38.1 in such prior art devices are all positioned to align with different respective lines of card hole locations such as the line 32.1–32.6.

The conventional mask 38 is intended to handle the problem of light leakage outside the reading station defined by the aperture 38.1. But there is still another aspect of the light leakage problem; leakage through the aperture 38.1. When an unpunched hole location such as 32.2 passes over the aperture 38.1, leakage light is transmitted through the aperture 38.1 directly to the photocell 30 to generate noise. It is this aspect of the leakage problem with which this invention is concerned.

FIG. 2 is a view looking down upon the structure of FIG. 1 as the tabulating card 32 is advanced by the picker knife 37 in the direction of the arrow 34 across the aperture plate 36. A hole 32.1 is punched in the tabulating card, and has a front edge **32.1*f* and a rear edge 32.1*r*. A conventional light port or aperture 38.1, smaller than the card hole 32.1, is formed in the mask or coating 38 of the plate 36. This aperture has front and rear edges 38.1*f* and 38.1*r* respectively. Its length along the direction 34** of card feed is $a$, while its transverse width is $b$.

The upper graph in FIG. 3 illustrates the wave form 50 of the output current of the photocell 30 with respect to time as the card hole 32.1 advances across the mask aperture 38.1. The circuit which receives this output is an on-or-off, or bistable, type of device. For example, the current output 50 can be passed through a resistance to develop a voltage proportional to the current. This voltage in turn is used to trigger a conventional triode switch circuit, by being applied to the control grid of a tube or base electrode of a transistor. The voltage output of the triode switch can then be used to control a flip-flop, to produce a sharply defined final output pulse 52 (lower graph of FIG. 3). The biasing levels in the binary circuitry just described are selected so that $I_0$ represents the photocell output current level at which it makes a decision to switch from biary "zero" to binary one." $I_1$ represents a higher current level which is sufficiently greater than $I_0$ so that there is no danger that negative noise excursions will caues the binary circuitry to switch back to a "zero" level. The pulse duration P extends from time $t_2$ to $t_9$, although in practice it is desirable to utilize only that portion of the pulse between the times $t_3$ and $t_8$, so that the pulse is sampled only when the photocell output current is at the level $I_1$. $I_m$ represents the photocell output current corresponding to a lamp intensity of L shining through a fully open mask aperture area of $ab$. $I_2$ represents the level of photocell output current generated by light which leaks through the body of the tabulating card 32 and through the mask aperture 38.1 when there is no hole punched in the card at the particular location then being scanned. This should not be confused with the dark current which flows in any photocell circuit even when the photocell is not illuminated. The current represented by $I_2$ is one that is associated with a definite level of noise illumination, which it is one of the obejcts of this invention to reduce.

In accordance with this invention, FIG. 4 illustrates a mask 58 in which the light port or aperture system associated with a single row of card holes 32.1 etc. comprises a plurality of discrete apertures 58.11 and 58.12 (i.e. apertures separated from each other by an opaque mask area 58.9). The sub-apertures 58.11 and 58.12 are spaced consecutively along the feed direction 34, but both fit simultaneously within the outline of a single card hole 32.1. Thus both apertures are positioned to align with and read one and the same line of tabulating card hole locations 32.1 etc. It is seen from the drawing that the dimensions and spacing of the two smaller apertures 58.11 and 58.12 bear a prescribed relationship to the dimensions of the single aperture 38.1 of FIG. 2. The transverse width of each of the smaller apertures remains $b$. The overall longitudinal distance across both apertures from front to rear remains $a$. But because of the opaque area 58.9 between the apertures, the total longitudinal aperture length of the two smaller apertures combined in a smaller dimension $a'$, the length of each separate sub-aperture being $\frac{1}{2}a'$. This form of aperture system shapes the photocell output current into a step-up, step-down configuration as illustrated by curves 70', 80', and 90' in FIGS. 5 and 6. The dimension $\frac{1}{2}a'$ is chosen long enough so that the stepped portion of these curves is above the $I_0$ switching level, and preferably above the $I_1$ sampling level, in order not to shorten the switching and sampling intervals.

The combined area of the consecutive apertures is $a'b$, which is less than the area $ab$ of the prior art single aperture 38.1 in FIG. 2. Because of the presence of the opaque mask area 58.9 serving as a light barrier within the confines of what was the prior art aperture area $ab$, for any given intensity of the lamp 20 less light can pass through the aperture system 58.11 and 58.12. The extent of the reduction in total illumination is equal to the ratio of the new total aperture area to the former aperture area, $a'b/ab=a'/a$ (keeping in mind that $a'$ is less than $a$).

Now suppose the principal problem is maintaining the stability of the output pulse duration P as the light level decreases. If the original light intensity is increased for use with this consecutive aperture system, the result is an improvement in pulse duration stability. This is because the light intensity determines how quickly the output current rises above the switching level and how long it stays there before dropping down again as the card hole crosses the aperture system. As a result the pulse duration and the pulse stability are dependent on the light intensity, both improving as the intensity is increased. The aperture system of this invention, furthermore, permits such an increase in intensity without the penalty of an increase in light leakage.

First let us assume that the original level of illumination is increased from $L$ to $L'=La/a'$. Light leakage through an unpunched hole location (e.g. 32.2) is proportional to the product of lamp intensity times mask aperture area. This product equals $Lab$ for the prior art reader of FIG. 2. For the embodiment of FIG. 4, under present assumptions, the corresponding product is $L'a'b'$. But $L'$ has just been defined as $La/a'$, so $$L'a'b=Laa'b/a'=Lab$$

or the intensity-area product is the same as in FIG. 2. In other words, the increased lamp intensity $L'$ is so chosen that it just compensates for the reduced aperture area in FIG. 4, and the result is the same level of light leakage $I_2$ as in FIG. 3. The resulting step-shaped photocell output current wave form is shown by the curve 70' in FIG. 5.

The photocell output wave form 70 in the top graph of FIG. 5 represents the current generated by the photocell 30 when the prior art single aperture 38.1 of FIG. 2 is used in conjunction with the original level of illumination L. The level L is chosen her rather than the higher level $L'$ because when the prior art single aperture 32.1 (FIG. 2) is used L is the highest illumination level that can be employed without increasing the light leakage current above $I_2$ (FIG. 3). Because of this restriction to a lower illumination level, the curve 70 has a somewhat lower slope than the corresponding curve 70' for the consecutive aperture system of FIG. 4. Therefore it intercepts the $I_0$ switching level somewhat later on the way up, and somewhat sooner on the way down. The lowermost graph of FIG. 5 shows that, as a result, even at full intensity L the pulse duration $P_1$ for the single aperture 32.1 of FIG. 2 is shorter than the corresponding pulse duration $P_1'$ for the consecutive apertures 58.11 and 58.12 of FIG. 4. This is one advantage of the invention.

Now assume that, for example, as a result of gradual deterioration of the light bulb 20, the intensity of illumination suffers a $1/k$-th decrease to $L'/k$. The resulting lower photocell output current for the consecutive apertures is shown by the curve 80'. Similarly the curve 80 is for the single aperture 32.1 when the light source has diminished to an intensity of $L/k$. Again, it is seen to have a lower slope than the corresponding $1/k$-th intensity curve 80'. Therefore with both at lowered intensity the consecutive aperture system of this invention still provides the greater pulse duration. Thus at any stage in the life of the lamp 30 the consecutive apertures allow a greater output pulse duration, which avoids the problem of designing logic circuitry to operate on a shorter pulse.

But the principal advantage involves the design of logic circuitry having a tolerance for a range of decreasing pulse durations experienced during successive stages of lamp life. The fractional reduction in pulse duration from high to low lamp intensity is greater with the single aperture than with the consecutive aperture arrangement, so that here too the consecutive aperture system decreases the severity of the design problem. Owing to the fact that the two curves 70' and 80' rise at different rates, and therefore cross the $I_0$ switching level at different times, it is seen from the next lower graph of FIG. 5 that the pulse duration declines from $P_1'$ for maximum light intensity $L'$ to the shorter interval $P_2'$ at the lower light intensity $L'/k$. But this decrease $P_1'-P_2'$ is less than the decrease $P_1-P_2$ resulting from the same fractional decrease in lamp intensity ($L$ to $L/k$) with the single aperture system (curves 70 and 80).

This can be proven mathematically. The total reduction in pulse duration is the sum of the amount of time by which the beginning of the pulse is delayed plus the amount of time by which the end of the pulse is accelerated. The decrease occurring at the beginning of the consecutive aperture pulse $P_1'$ is the increase in rise time $t_{13}-t_{11}$; i.e. the difference in the time it takes the curve 70' to rise from O to $I_0$ as compared to the curve 70' (FIG. 5). The corresponding decrease at the beginning of the single aperture pulse $P_1$ (curves 70 and 80) is the increase in rise time $t_{14}-t_{12}$.

It will now be proved that the single aperture rise time increase $t_{14}-t_{12}$ is greater than the corresponding consecutive aperture increase $t_{13}-t_{11}$. The rate of rise or slope S of the high illumination curve 70 is given by:

$$S=\frac{I_0}{t_{12}-t_{10}}$$

Therefore the rise time $t_{12}-t_{10}$ for that curve is given by:

$$t_{12}-t_{10}=I_0/S$$

The rate of rise S is proportional to the illumination intensity; thus when that intensity decreases from $L$ to $L/k$ the slope S decreases to $S/k$. Therefore the slope of the reduced illumination curve 80 is $S/k$, and is given by:

$$S/k=\frac{I_0}{t_{14}-t_{10}}$$

Therefore the increased rise time (curve 80) $t_{14}-t_{10}$ is given by:

$$t_{14}-t_{10}=I_0k/S$$

It follows that the increase in rise time from curve 70 to curve 80 is:

$$(t_{14}-t_{10})-(t_{12}-t_{10})=t_{14}-t_{12}=\frac{I_0k}{S}-\frac{I_0}{S}=\frac{I_0}{S}(k-1)$$

Similar calculations can be made for the consecutive aperture curves 70' and 80', keeping in mind that the slope (rate of rise) is proportional to the intensity of illumination times the aperture width. The aperture width is held constant at $b$, but the illumination is $L'/L$ times as great as in the case of curve 70. Therefore the slope of curve 70' is greater than S, and equal to:

$$SL'/L=Sa/a'=\frac{I_0}{t_{11}-t_{10}}$$

Thus the rise time $t_{11}-t_{10}$ is given by:

$$t_{11}-t_{10}=\frac{I_0a'}{Sa}$$

After the intensity drops to $L'/k$ (curve 80') the slope is:

$$SL'/kL=Sa/ka'=\frac{I_0}{t_{13}-t_{10}}$$

The increased rise time is therefore:

$$t_{13}-t_{10}=\frac{I_0ka'}{Sa}$$

The increase in rise time from curve 70' to curve 80' is thus:

$$(t_{13}-t_{10})-(t_{11}-t_{10})=t_{13}-t_{11}=\frac{I_0ka'}{Sa}-\frac{I_0a'}{Sa}=\frac{I_0a'}{Sa}(k-1)$$

It follows that the ratio of the increase in rise time with the single aperture to the corresponding increase with the consecutive aperture system is:

$$\frac{t_{14}-t_{12}}{t_{13}-t_{11}}=\frac{I_0(k-1)}{S}\Big/\frac{I_0a'(k-1)}{Sa}=a/a'$$

Thus the increase in rise time as the lamp 20 deteriorates is greater with the single aperture than with the consecutive aperture system by a factor of $a/a'$, i.e. the ratio of their respective total aperture lengths. It can be shown in the same manner that the same ratio of pulse duration shortening holds true for the trailing ends of the output pulses; that is:

$$\frac{t_{17}-t_{15}}{t_{18}-t_{16}}=\frac{I_0(k-1)}{S}\Big/\frac{I_0a'(k-1)}{Sa}=a/a'$$

Thus, taking the shortening at both the front and rear ends of the pulses into account, the total decrease in pulse duration $P_1-P_2$ for the single aperture is $2a/a'$ times as great as the total decrease $P_1'-P_2'$ for the consecutive apertures. Since the single aperture pulse $P_1$ was smaller to begin with, it is seen that its larger absolute decrease $P_1-P_2$ represents a greater fractional decrease thereof than $P_1'-P_2'$ does of $P_1'$ in the case of the consecutive apertures.

To summarize and restate this proof in more general form, the duration $p$ of any pulse can be written as the following function of the variable $e$:

$$p=C-2e$$

where C is the constant time interval $t_{19}-t_{10}$, and $e$ equals the rise time from $t_{10}$ until $I_0$ is reached (and also equals the fall time from the downward crossing of $I_0$ until $t_{19}$). But $I_0/e$ is the slope of the curve, which varies directly as the light intensity $l$. If the proportionality constant is N, then:

$$I_0/e=Nl$$

It follows that:

$$e=\frac{I_0}{Nl}$$

Therefore the pulse duration is given by:

$$p=C-\frac{2I_0}{Nl}$$

This equation, where all the constants are in upper case and the variables in lower case, gives the pulse duration $p$ as a function of the light intensity $l$. It shows that as $l$ increases, the quantity $2I_0/Nl$ decreases and therefore C minus that quantity increases. Therefore the pulse duration $p$ increases as the light intensity $l$ increases. Since the multiple aperture system permits the use of greater light intensities without a rise in the leakage level, greater pulse duration is seen to be one of the advantages accruing from the invention. As to pulse duration stability, a measure of this is the rate of change of the pulse duration $p$ with respect to the light intensity $l$, which is given by:

$$\frac{dp}{dl}=\frac{2I_0}{Nl^2}$$

Therefore, as a principal advantage of the invention, the rate of change decreases (hence the stability increases) as the light intensity $l$ increases, the rate being geometrical because of the square. It will therefore be appreciated that this invention, by permitting a substantial increase in light intensity without any increase in leakage, results in a disproportionately large improvement in pulse duration stability.

Now suppose that instead of pulse duration stability, the principal problem is light leakage under no-hole conditions, i.e. when the optical card reader scans an unpunched hole location 32.2. In that case the amount of leakage illumination escaping through the card 32 and reaching the photocell 30 is dependent upon the lamp intensity and the total aperture area. The effective aperture area has been reduced from $ab$ to $a'b$, a fractional reduction of $a'/a$. Therefore, if the same lamp intensity L is used in the improved reader of FIG. 4 as in the prior art reader illustrated in FIG. 2, the improved device will have only $a'/a$ as much light leakage as the prior art device. This is seen in FIG. 6, where the leakage current $I_3$ is much lower than the corresponding level $I_2$ of FIG. 3. As a result, a reader in accordance with this invention will be more accurate and reliable, and will need to meet less critical design requirements.

Although a reduction in signal illumination also occurs, this does not result in any degradation of performance. FIG. 6 illustrates what happens when a hole is sensed by a device in accordance with FIG. 4. The rate of rise (slope) of the photocell output current curve 90 is governed by the rate of increase of photocell illumination. This in turn is a function of the aperture width, the rate of card feed, and the intensity of the lamp. In changing to the consecutive aperture system of FIG. 4, the aperture width was held constant at $b$, and the rate of card feed is not affected. In addition, we are now assuming that the lamp intensity is also held constant at L. Therefore, as the card hole 32.1 sweeps across the apertures 58.11 and 58.12 the photocell output current (curve 90) rises initially at the same rate as before (curve 50, FIG. 3). In this embodiment the dimension $\frac{1}{2}a'$ is so chosen that the front edge 32.1f of the card hole does not reach the front edge 58.12f of the rearward sub-aperture until time $t_3$, and the rear edge 32.1r of the card hole reaches the rear edge 58.11r of the front sub-aperture by time $t_8$. This means that prior to time $t_3$ and subsequent to time $t_8$ the card hole 32.1 and the aperture system 58.1 do not overlap enough for the middle barrier 58.9 to be "seen" by the lamp 30, and therefore this barrier is not effective to reduce the light-passing area during those intervals. Thus the curve 90 intersects the $I_0$ switching level and the $I_1$ sampling level at times $t_2$ and $t_3$ respectively, just as the curve 50 does in FIG. 3. On the downward slope both curves similarly intersect these levels at the same times $t_8$ and $t_9$. Therefore, the resulting output pulse 92 begins and ends at same times as the prior art output pulse 52; and the total output pulse duration again is equal to P, with the sampled portion thereof $t_3$ to $t_8$ also being undiminished. Thus, with the consecutive aperture system of this invention, if the lamp intensity is maintained at the same level L as in prior art systems and the dimension $\frac{1}{2}a'$ is properly chosen with respect to $I_0$, the presence of the middle barrier 58.9 does not affect pulse duration.

During the time $t_3$ to $t_4$ that the front edge 32.1f of the card hole is crossing the inter-aperture space 58.9, the illumination and the photocell output current do not rise any further; however, the level which the output current has reached and at which it then holds constant is the sampling level $I_1$. When the front edge 32.1f of the card hole reaches the rear edge 58.11r of the front aperture at time $t_4$, the level of illumination and the photocell output current begin to rise again. At time $t_5$ the front edge 32.1f of the card hole passes the front edge 58.11f of the front aperture, and thereafter the illumination remains at a constant high level. This level is lower than that which would be obtained without the barrier 58.9. Therefore it results in a maximum photocell current $I_n$ which is lower than the maximum $I_m$ of FIG. 3, but nevertheless it exceeds the sampling level $I_1$. At time $t_6$ the trailing edge 32.1t of the card hole begins to sweep across the two apertures 58.11 and 58.12 in the same manner, and then the decreasing photocell output current performs a similar series of steps downward through times $t_7$, $t_8$, and $t_9$. Thus, at all times between $t_3$ and $t_3$ the curve 60 is at or above the sampling level $I_1$, just as in the prior art device of FIG. 2.

The approach of this invention, in another embodiment thereof, can be used to mitigate the problem of off-punch by placing a limit on the resulting reduction in illumination. FIG. 7 illustrates a situation in which the hole 32.1 punched in the card is displaced from its proper location in a sideward direction 93; that is, perpendicularly to the direction 34 of card feed. A perforated record reader would normally be designed to sense such holes even when they are widely off-punch, up to a maximum off-punch tolerance. In a high performance device the off-punch tolerance may exceed half the total width of the hole along the direction 93 of hole misplacement. Such a displacement is seen in FIG. 7, where the card hole 32.1 is laterally displaced so far in the direction 93 that one side edge 32.1s of the hole has passed beyond the longitudinal center line 95 of the ideal hole position by a distance $c$. In this situation it is apparent that only a portion of the prior art aperture 38.1, specifically a portion having a width of $\frac{1}{2}b-c=\frac{1}{2}b'$, will mate with the card hole 32.1. Therefore, signal illumination will pass only through the small overlap area $\frac{1}{2}ab'$ instead of through the entire aperture area $ab$. This causes a severe fractional reduction in the amount of illumination reaching the photocell. The amount of this reduction is seen by evaluating the ratio of the original aperture area $ab$ to the reduced light-passing area $\frac{1}{2}ab'$:

$$\frac{1}{2}ab'/ab=\frac{1}{2}b'/b=\frac{\frac{1}{2}b-c}{b}=\frac{1}{2}-\frac{c}{b}$$

This means that the reduced area is $$\frac{1}{2}-\frac{c}{b}$$

or less than ½, of the original area. Consequently the fractional reduction in signal level is more than ½. Thus the problem of large fluctuations in strength can occur on a short-term basis as a result of variations in hole location, as well as over the long-term deterioration of the lamp 20. The short-term fluctuations cause the same problems of pulse duration stability as do the long-term variations.

In FIG. 8 it is seen that the approach to this problem is again to provide a mask, here designated 98, in which the single aperture of the prior art is divided into two discrete sub-apertures separated from each other by an opaque area 98.9. This embodiment differs from the one previously described in that here the sub-apertures, designated 98.11 and 98.12, are parallel to each other and spaced from each other perpendicularly to the direction 34 of card feed. The length of both apertures 98.11 and 98.12 remains $a$, while the overall width across both apertures remains $b$. The individual width of each sub-aperture is $\frac{1}{2}b'$, and the inter-aperture spacing is $2c$, where $c$ is the distance that the side edge 32.1*s* of the card hole moves beyond the longitudinal center line 95 when the hole 32.1 is mislocated by an amount equal to the maximum off-punch tolerance of the machine.

The total aperture area is now $ab'$, which is less than the original area $ab$. Therefore, if the intensity of the lamp 20 is not correspondingly increased there will again be an advantageous reduction of light leakage as explained above in connection with FIG. 4. Alternatively the light intensity can be increased from L to $$L''=Lab/ab'-Lb/b'$$

in order to maintain the illumination at a level corresponding to the original light leakage current $I_2$ of FIG. 3.

The advantage of either arrangement with respect to the off-punch problem is illustrated in FIG. 9. There it is seen that the side edge 32.1*s* of the card hole has moved in the direction 93 beyond the center line 95 of the ideal hole position by the maximum tolerable amount $c$, just as in FIG. 7. The side edge 32.1*s* of the card hole now coincides with the side edge 98.11*s* of one of the sub-apertures. Thus, only one of the sub-apertures 98.12 projects beyond the card hole 32.1. The other aperture 98.11 reaches to the side edge 32.1*s* thereof but does not project beyond it, thus mating completely with the card hole 32.1 despite the off-punch. Since one of two equal sub-apertures is fully available to pass light, the amount of signal illumination passing through the overall aperture system 98.1 is only reduced by ½, instead of by more than ½ as in FIG. 7. Because the inter-aperture spacing is $2c$, if the card hole 32.1 were mislocated by the same maximum tolerable amount $c$ to the other side of the longitudinal center line 95 (i.e. in the opposite direction to arrow 93), then the roles of the sub-apertures 98.11 and 98.12 would be reversed but the same signal reduction of only ½ would occur. Therefore, the parallel aperture system of FIGS. 8 and 9 places a ceiling of ½ on the short term signal variations which can occur as a result of off-punch within the tolerance of the device. Since pulse length is a function of rise time, which in turn is proportional to signal illumination, limiting the short term signal fluctuations in this manner again serves to limit the range of variation in pulse duration resulting from such fluctuations. This improvement in pulse duration stability has significant advantages, as noted above.

A further embodiment of this invention is illustrated in FIG. 10, where the mask aperture group 108.1 is seen to consist of four discrete sub-apertures. The front two apertures 108.12 and 108.13 are spaced along the direction 34 of card feed from the rear two 108.11 and 108.14, thus employing the consecutive aperture principle of FIG. 4. In addition, the two apertures 108.11 and 108.12 on one side are spaced transversely from the two on the other side 108.13 and 108.14, according to the parallel aperture principle of FIGS. 8 and 9. The individual dimensions of each of the four apertures are $\frac{1}{2}a'$ by $\frac{1}{2}b'$, while the overall dimensions of the aperture system 108.1 are $a$ by $b$, as taught above in connection with the foregoing embodiments. The light intensity necessary to maintain full strength illumination in this case is $$L'''=abL/a'b'$$

This embodiment combines the advantages of both the consecutive aperture and parallel aperture systems.

In regard to any embodiment of this invention, it should be explained that the use of discrete apertures, although preferred, is not required. Thus the necessary degree of aperture separation for the practice of this invention could be obtained using a pair of apertures forming a figure "8" and contacting each other at a point. The apertures could even meet along a line, provided the line of contact were shorter than the total aperture width (e.g. two trapezoidal apertures having a short base in common). A "Siamese twin" or dumbbell-shaped system (i.e. two apertures joined by a narrow band) could also be used.

FIGURE 11 depicts an embodiment wherein two ports 40 and 42 are blended into one continuous shape but is partially occluded in an intermediate region 43 by a material of greater opacity than the remaining area. Thus, the glass light ports 40 and 42 change from relatively translucent at either end to relatively less translucent in between the end portions. The change in translucency need not be abrupt; it can be a smooth transition and still achieve the same effect. The scope of the invention includes such variations.

By now it will be realized that this invention discloses novel perforated record reader structure which makes significant contributions to the solution of the problems of light leakage, signal variation, and pulse length stability.

What has been described is a preferred embodiment and is believed to be the best mode of practicing the invention, but it will be clear to those skilled in the art that modifications may be made therein without departing from the principles of the invention. Accordingly this description is intended just as an example, the scope of the invention being stated in the appended claims.

We claim:

1. A stored information reader comprising:
   (a) a record member having at least one perforation to store an information datum, the area outside said perforation of said record member being partially opaque;
   (b) a radiation source emitting radiation;
   (c) a radiation detector means, said record member interposed between said radiation source and said radiation detector means;
   (d) a masking means positioned between said record member and said radiation detector means for blocking the passage of leakage radiation through said partially opaque area of said record member, said masking means including at least first and second ports for simultaneously admitting radiation from said radiation source to said radiation detector means via said at least one perforation in said record member in order to sense said information datum.

2. A stored information reader in accordance with claim 1 wherein said first and second ports are spaced from each other along the longitudinal axis of said masking means.

3. A stored information reader in accordance with claim 1 wherein said masking means comprises an opaque material wherein said first and second ports are translucent.

4. A stored information reader in accordance with claim 1 wherein said first and second ports are spaced on either side of the longitudinal axis of said masking means.

5. A stored information reader in accordance with claim 4 wherein the inner edge of said first and second ports are respectively displaced on either side of said longitudinal axis of said masking means by a distance *c*, said first and second ports being spaced from each other in a transverse direction from said longitudinal axis by a distance of 2*c*.

6. A stored information reader in accordance with claim 5 wherein the lengths of said first and second ports are substantially equal to that of said perforation in said record member.

7. A stored information reader in accordance with claim 6 wherein said first and second ports are positioned on either side of said longitudinal axis through said masking means, said first and second ports being parallel to one another.

8. A stored information reader comprising:
(a) a record member having at least one perforation to store an information datum, the area outside said perforation of said record member being partially opaque;
(b) a radiation source emitting radiation;
(c) a radiation detector means, said record member interposed between said radiation source and said radiation detector means;
(d) a masking means positioned between said record member and said radiation detector and contiguous to said record member for blocking the passage of leakage radiation through said partially opaque area outside said perforation, said masking means including first and second ports which are arranged so that said perforation of said record member when being sensed is positioned directly over said ports to allow simultaneous passage of radiation from said radiation source to said radiation detector means.

9. A stored information reader comprising:
(a) a record member having at least one perforation to store an information datum, the area outside said perforation of said record member being partially opaque;
(b) a radiation source emitting radiation;
(c) a radiation detector means, said record member interposed between said radiation source and said radiation detector means;
(d) a masking means positioned between said record member and said radiation detector means for blocking the passage of leakage radiation through said partially opaque area of said record member, said masking means including at least first, second, third and fourth ports for simultaneously admitting radiation from said radiation source to said radiation detector means via said at least one perforation in said record member in order to detect said information datum.

10. A stored information reader in accordance with claim 9 wherein said first port is spaced from said third port and said second port is spaced from said fourth port in the direction of a longitudinal axis through said masking means, said first and third ports being positioned on one side of said longitudinal axis and said second and fourth ports being arranged on the opposite side of said axis.

11. A stored information reader in accordance with claim 10 wherein said first and third ports as well as said second and fourth ports are each displaced transversely from said longitudinal axis through said masking means by a distance *c*, said first and third ports being displaced respectively from said second and fourth ports by a distance 2*c*.

12. A stored information reader comprising:
(a) a radiation source emitting continuous radiation;
(b) a radiation responsive means arranged to provide an output signal which is a function of the amount of radiation from said radiation source incident thereon;
(c) gating means connected to said radiation responsive means to receive said output signal from said radiation responsive means, said gating means adapted to be triggered when said output signal reaches a selected level;
(d) a record member interposed between said radiation source and said radiation responsive means having at least one perforation to store information datum, the area outside said perforation of said record member being partially opaque;
(e) means for advancing said record member in a selected direction to permit said radiation from said radiation source to impinge upon said record member;
(f) a masking means positioned between said record member and said radiation detector for blocking the passage of leakage radiation through said partially opaque area of said record member, said masking means including at least first and second ports for simultaneously admitting radiation from said radiation source to said radiation detector means via said at least one perforation in said record member, the ports being arranged so that the output signal produced by said radiation and detected by said radiation responsive means rises uninterruptedly to a selected level when said at least one perforation is positioned over said first port of said masking means, said selected signal level being of a magnitude to trigger said gating means, said output signal produced by said radiation detected by said radiation responsive means remaining constant when said at least one perforation is over said first port and said opaque area of said masking means, said output signal produced by radiation detected by said radiation responsive means rising to a maximum level when said at least one perforation of said record member is positioned over both said first and second perforations as well as said opaque area of said masking means.

13. A stored information reader comprising:
(a) a record member having at least one perforation to store an information datum, the area outside said perforation of said record member being partially opaque, said perforation having first and second side edges;
(b) a radiation source emitting radiation;
(c) a radiation detector means, said record member interposed between said radiation source and said radiation detector means;
(d) a masking means positioned between said record member and said radiation detector means for blocking the passage of leakage radiation through said partially opaque area of said record member, said masking means including first and second parallel ports positioned on either side of a longitudinal axis by a distance *c* through said masking means for simultaneously admitting radiation from said radiation source to said radiation detector means via said at least one perforation in said record member in order to sense said information datum, said longitudinal axis of said masking means and either said first or second side edges of said perforation having a maximum off-punch tolerance of distance *c*, whereby the loss of radiation due to misregistry of said perforation and said first and second ports due to said maximum off-punch tolerance is no greater than 50 percent.

References Cited by the Examiner

UNITED STATES PATENTS

| | | | |
|---|---|---|---|
| 2,510,599 | 6/50 | Owens | 250—219 |
| 2,687,611 | 8/54 | Larsen | 250—237 X |
| 2,790,088 | 4/57 | Shive | 250—219 |
| 2,795,705 | 6/57 | Rabinow | 250—237 X |
| 3,026,419 | 3/62 | Aweida et al. | 250—219 |

RALPH G. NILSON, *Primary Examiner.*

ARCHIE R. BORCHELT, *Examiner.*